INVENTORS
PAUL E. BAKER
STANLEY B. JONES
BY
ATTORNEYS

INVENTORS
PAUL E. BAKER
STANLEY B. JONES
BY
/ATTORNEYS

United States Patent Office 2,883,548
Patented Apr. 21, 1959

2,883,548

RADIOACTIVITY WELL LOG TRANSMISSION SYSTEM

Paul E. Baker, Anaheim, and Stanley B. Jones, Whittier, Calif., assignors to California Research Corporation, San Francisco, Calif., a corporation of Delaware Application November 4, 1955, Serial No. 545,072

6 Claims. (Cl. 250—71)

This invention relates to a method of, and apparatus for, transforming a representative portion of information in the form of high-frequency signals into a form of low-frequency signals for signaling in a well bore in which a maximum number of low-frequency signals per unit time are obtained, and more particularly relates to an apparatus for recording at the earth's surface variations in the magnitude of quantities measured along a bore hole as an indication of the values of a plurality of measurable characteristics of earth formations traversed by the well bore, and has for an object the provision of a system for recording at the earth's surface summations of randomly occurring electrical pulses of short duration and varying relative amplitudes developed in the bore hole as a measure of a plurality of characteristics of earth formations, such as the electrical pulses produced by a scintillation crystal and photomultiplier tube combination used in measuring radiations arising from an earth formation.

In the art of well bore signaling, it has been proposed that certain high-frequency forms of information developed within the well bore, as a measure of a plurality of characteristics of the earth formations being investigated, be transmitted to surface recording equipment over coaxial or single conductor cables by means of frequency modulation, band-pass filtering or by direct transmission of the high-frequency form of signal. Unfortunately, none of the systems proposing the use of coaxial cables has been adopted in field practice because of the problem of constructing a coaxial cable having sufficient mechanical strength to support even its own weight for more than a few hundred feet, and at the same time having both a suitably small diameter and the desired high-frequency transmission characteristics. Since most well logging work requires a cable to traverse several thousand feet of well bore and support at its end a large weight, it is essential that the cable have considerable mechanical strength. The proposal that high-frequency signals be sent over a single conductor cable having adequate mechanical strength has not been found possible to realize because of the inability of such a cable to transmit signals having a band width of more than a few kilocycles per second. Thus, high-frequency information ranging upward to about 4 megacycles cannot be transmitted satisfactorily over presently known transmission systems, except over such limited depths, or by use of such high energy inputs, as to be economically unfeasible.

It has become increasingly important in the field of radioactivity well logging to be able to transmit high frequency information where it is desired to detect and measure individual radiation quanta. In the logging of natural gamma radiations, such as those emanating from radioactive potassium, uranium, and thorium, it is desirable to be able to measure the individual energy of each quantum and the relative frequency of occurrence of each quantum energy in order to obtain the ratios of the naturally radioactive materials for geological correlation. The total number of quanta may range upwardly to about 100,000 which must be detected, measured and corresponding signals transmitted to the earth's surface for each analysis of an earth formation adjacent the well bore. These data may be accumulated over a period as short as a few seconds. This same problem is also presented in measuring and recording induced gamma radiation and neutron-capture gamma radiation quanta, but the problem is further aggravated by the necessity of handling the characteristic pulses at a rate up to about one million counts per minute or more.

Since multi-conductor D.C. cables are almost universally used by well logging service companies in conventional electric logging to measure resistance and self-potential existing along a bore hole, such cables are readily available for logging virtually any depth of well bore, with assurance that the detecting instruments suspended therefrom can be successfully run without danger of loss in the well bore. For this reason, it has long been desired to be able to transmit high-frequency forms of information over a standard multiconductor well logging cable.

Furthermore, in nuclear well logging it is oftentimes desirable to measure the amplitudes of individual high-frequency pulses so as to determine the energies of nuclear radiation incident upon the detector. It is a characteristic of nuclear radiation that the rays or particles are randomly distributed in time so that there is a tendency for overlapping of pulses to increase with counting rate for a given individual pulse length. Now it has been suggested that the individual high-frequency pulses might be transmitted over conventional single conductor or multiconductor cables, if they first were converted to low-frequency pulses which are transmitted more readily over conventional cable. However, it is a characteristic of the low-frequency pulses that their duration in time is proportionately longer than the duration in time of the high-frequency pulses. Now, the counting rate of the detector must be maintained sufficiently low so that there is little overlapping of the pulses in the detector if satisfactory measurements of radiation energies are to be made. However, detectors such as the scintillation spectrometer require only extremely short times for the generation of high-frequency pulses with amplitudes representative of the energies of the radiation quanta. Consequently, although the detector counting rate may be maintained sufficiently low that the overlapping, or pileup, of pulses in the detector is negligible, there may be severe overlapping or pile-up of the low-frequency pulses being transmitted over the cable. This overlapping of the low-frequency pulses traversing the cable necessarily prevents accurate measurement at the surface of the energy spectrum of the nuclear radiation impinging on the detector.

The foregoing problem recently has been made more severe with the availability of high-intensity polonium-beryllium neutron sources, and the availability of down-hole particle-accelerators as sources of nuclear radiation. It is possible now to obtain extremely high counting rates at the detector, and, hence, it has been increasingly desirable to provide a system that will permit increasing the rate at which pulses, representative of the radiation energy spectrum, may be transmitted to the surface. Application of such a system for obtaining increased transmission rate correspondingly increases the logging speed and thus enables many nuclear logging methods to be practiced commercially, which could not be practiced heretofore because of the excessive costs of oil well rig time that are attendant with extremely slow logging speed.

In accordance with the present invention, high-frequency pulses from the radiation detector are converted to low-frequency pulses for transmission, but only a portion of the high-frequency pulses is selected, and these in such a manner with respect to time, as to maximize the number of usable low-frequency pulses. The low-frequency pulses are no longer distributed randomly in time, but nevertheless still represent accurately the initial pulse amplitude spectrum from the detector. Whereas previously, in transmitting pulses randomly distributed in time it has been necessary to maintain the separation of the pulses in time to intervals equal to at least many times the pulse duration, so as to make pulse overlap negligible, the present invention makes it possible to space the low-frequency pulses very closely in time and accordingly increases the maximum pulse transmission rate.

In a preferred form of apparatus for carrying out the method of the present invention, a high-frequency electrical pulse is generated by the detector, such as a scintillation crystal and photomultiplier tube combination, in response to the arrival of an individual radiation quantum. After amplification the pulses are applied to a discriminator which eliminates all pulses of less than a predetermined amplitude and passes all larger ones preserving the shape of the pulse amplitude spectrum but not its relative height. One pulse, after passing the discriminator, is then delivered to an electrical circuit that lengthens or stretches the pulse so that it is converted essentially to a low-frequency pulse readily transmitted over conventional well logging cable. At the same time at least a portion of the pulse is delivered to a "dead-time" or "squelcher" circuit. This circuit inactivates the input to the pulse stretcher circuit immediately after passage of the unstretched pulse and it maintains the input to the pulse stretcher circuit inactivated throughout the duration of the pulse, and for a short predetermined time thereafter. At the same time, the stretched pulse is delivered to the well logging cable for transmission to the surface. Use of this combination of circuits prohibits any subsequent pulse from entering the well logging cable close enough behind the selected pulse to overlap such preceding pulse in the cable. Following said predeterminable time after the end of transmission of the selected pulse, said circuit is prepared for reception of another pulse from said detector.

Further objects and advantages of the present invention will become apparent from the following detailed description taken in conjunction with the accompanying drawings which form an integral part of the present specification.

Figure 1:
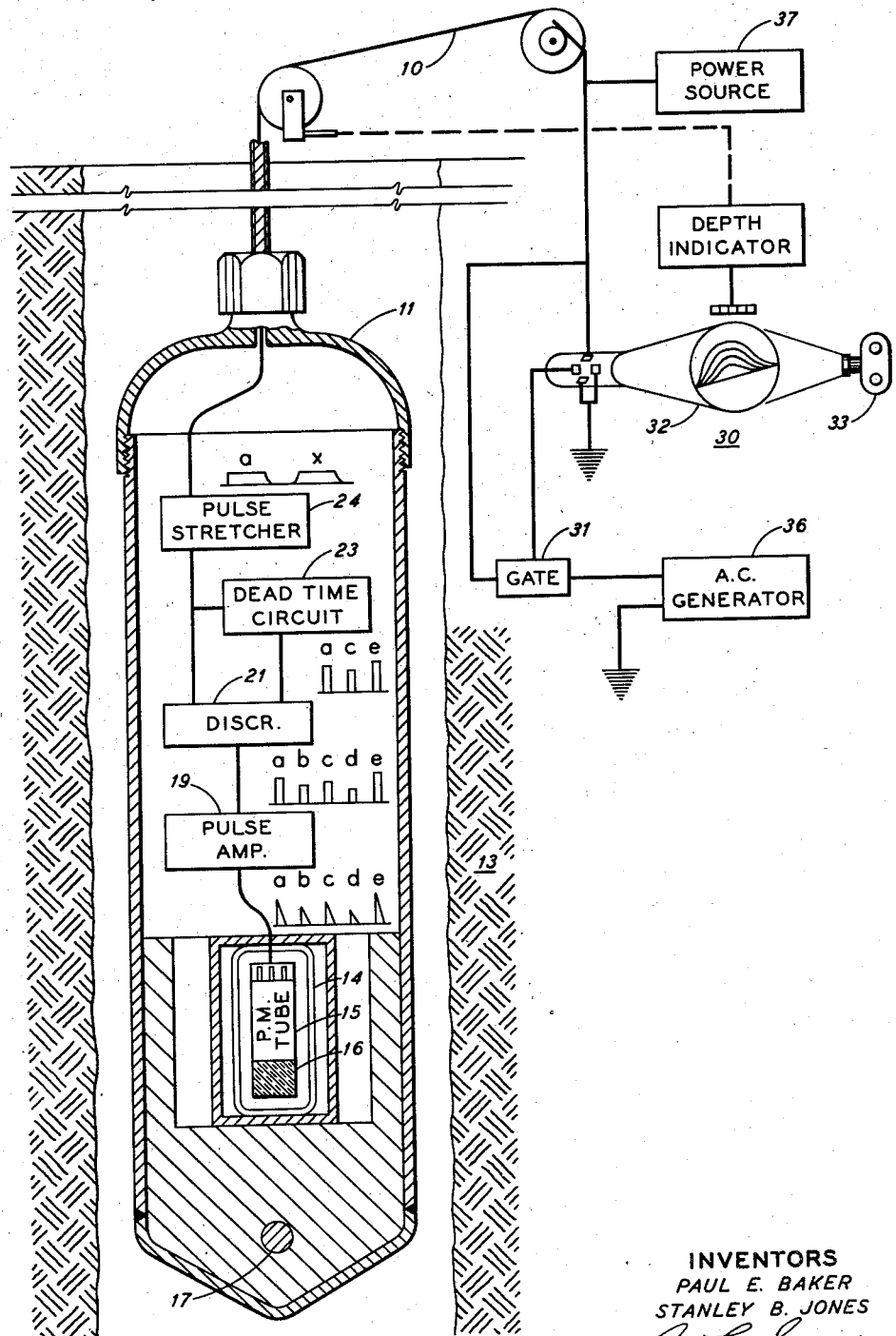
Fig. 1 is a diagrammatic representation of a well transmission system wherein the method of the present invention is applied to a logging apparatus for recording gamma ray energy spectra.

Referring now to the drawings, and in particular to Fig. 1, there is illustrated a preferred form of apparatus for carrying out the method of the present invention in which a gamma ray spectrum may be transmitted over a well logging cable 10 of limited frequency and power transmission characteristics. As shown, logging sonde 11, wherein the signal analysis and generating equipment are located, is adapted to traverse a well bore 12 while supported at the lower end of logging cable 10. For reasons discussed above, logging cable 10 has considerable structural strength in order to support the relatively heavy logging sonde 11, as well as several thousand feet of its own length. Additionally, the cable must be relatively small in diameter so that several thousand feet of cable may be readily handled in field operations. Accordingly, the amount of power and the frequency characteristics of the cable are quite limited. In practice the electrical power must be restricted to the order of about 150 watts at not over about 200 volts. Thus, using a line of several thousand feet in length, it has been found difficult to transmit electrical pulses representing gamma ray quanta at a rate sufficiently fast to permit logging sonde 11 to traverse well bore 12 at a reasonable rate. This limitation is due primarily to the fact that a scintillation spectrometer, such as that identified as 14, which includes photomultiplier tube 15 and scintillation crystal 16, may deliver pulses of very short duration of about ½ to 1 microsecond in duration, and at extremely high rates. In the arrangement of Fig. 1, the gamma ray spectrum arising from earth formation 13 is produced by capture of neutrons by constituent nuclei in earth formation 13 after emission of the neutrons from neutron source 17. The rate of occurrence of individual pulses may easily be made of the order of several hundred thousand per second.

In accordance with the present invention, there is provided an improved system for transmitting electrical pulses, each of which represents an individual gamma ray interaction with crystal 16 over well logging cable 10 without seriously reducing the counting rate, and wherein the individual pulses may be measured at the earth's surface for recording as a portion of the total spectrum derived from earth formation 13. In accordance with this invention the individual electrical pulses occurring randomly, both in time and energy, are converted by pulse amplifier 19 to electrical pulses having amplitudes corresponding to the energy dissipated during interaction of a gamma ray quantum with crystal 16. Each of the pulses is then amplitude-discriminated by discriminator 21 for rejection of all pulses having less than a predeterminable minimum amplitude.

Alternatively, discriminator 21 may be considered a pulse selector passing only pulses having at least a minimum amplitude value. Further, in accordance with the present invention, the output of discriminator 21 is connected to both a dead-time circuit 23 and a pulse stretcher 24 for transmission of one of said pulses having a predeterminable minimum value. As will be explained more fully in connection with the circuit diagram illustrated in Figs. 2 and 3, the arrival of a signal representing the selected pulse at the input of dead-time circuit 23 originates a signal to inactive discriminator 21 for a predeterminable time. Thus the selected pulse passing through pulse stretcher 24 may be elongated in time to a preselected value while maintaining its linear relation in amplitude to the original input pulse. Following the termination of said pulse stretching operation, the dead-time circuit 23 operates to permit another pulse from discriminator 21 to pass both to the pulse stretcher 24 and dead-time circuit 23. In this way there is assured a relatively even distribution in time of pulses having a predeterminable length and each having an amplitude linearly related to one of the representative pulses originating at the scintillation spectrometer. The pulses thus stretched present an electrical signal within the frequency and power characteristics of an essentially DC line, such as logging cable 10.

As further illustrated in Fig. 1, the individual pulses treated in the manner of the present invention may be suitably recorded at the earth's surface by the recording system indicated generally as 30. This system includes a cathode ray oscilloscope 32 and a camera 33 adapted to make a time exposure of the traces 34 appearing on the face of oscilloscope 32. As is conventional in the recording of such gamma ray spectra, the horizontal deflection of the cathode ray beam may be governed by a trigger circuit, identified as gate 31, actuated by incoming pulses while the vertical deflection of trace 34 is accomplished by connecting the pulses arriving on well logging cable 10 to the vertical deflection plates of oscilloscope 32. A suitable power source, such as that indicated as 37, may be utilized for providing the operating potentials to the electronic equipment contained in logging sonde 11.

Figure 2:
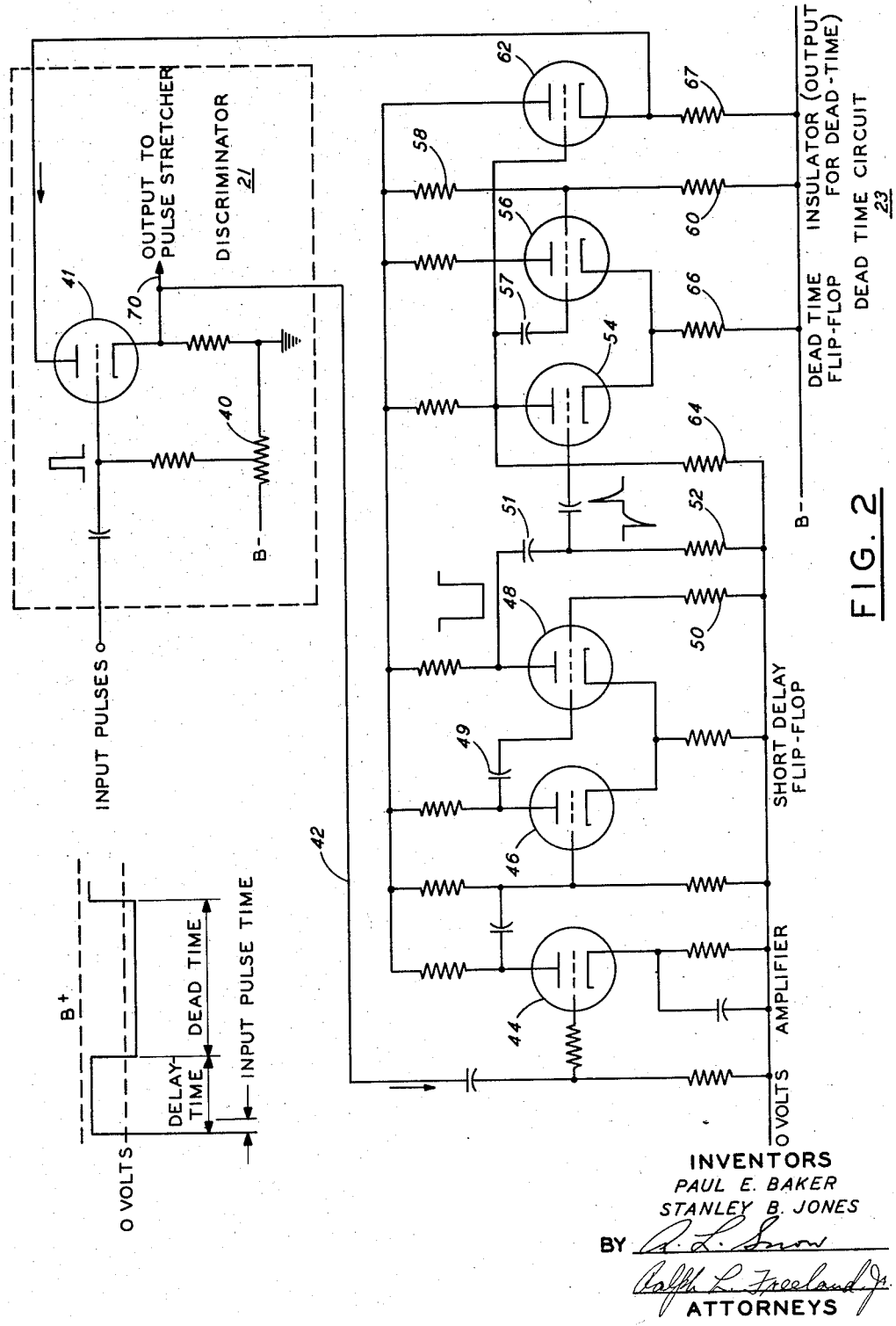
Fig. 2 is a schematic wiring diagram illustrating a preferred form of the pulse discrimination and dead time circuits for the system of Fig. 1.

Referring now to the particular circuits useful in carrying out the method in the present invention, reference is made to Fig. 2, in which there is illustrated in further detail discriminator circuit 24 and dead-time circuit 23. In the arrangement of Fig. 2, input pulses from amplifier 19 are supplied to discriminator circuit 21 by means of an RC network including variable resistor 40. Resistor 40 permits adjustment of the input potential or bias of the cathode follower stage provided by tube 41 so that the output thereof will transmit all pulses of amplitude greater than a given bias voltage, as will be explained more fully hereinafter. The cathode follower stage 41 is rendered inoperative by pulses derived from dead-time circuit 23 to prevent transmission of any pulses during the predetermined dead-time. In the present discriminator circuit, this function is performed by removal of plate potential from tube 41. Desirably tube 41 is of the sharp cutoff type in order to insure critical discriminator action.

As further shown in Fig. 2, a portion of the output of discriminator 21 is connected through line 42 to dead-time circuit 23. Thus, if a positive going pulse, having a predeterminable minimum value, is received at discriminator 41, there is supplied to the grid of amplifier tube 44 of dead-time circuit 23 a similar positive pulse. The output of amplifier 44 provides an amplified negative pulse to the input of a flip-flop circuit, which includes tubes 46 and 48. Such a negative pulse applied to the grid of tube 46 causes tube 46 to pass from a normally conducting state to a nonconducting state and thereby causes normally nonconducting tube 48 to become conducting. The time of such reversal of the conductivity of tubes 46 and 48 then continues for a time determined primarily by condenser 49 and resistor 50. These values may be selected so that the time will be just longer than the incoming pulse. For example, if the input pulse is of the order of one microsecond in length, the time delay may be of the order of 1½ to 2 microseconds.

The output of the flip-flop circuit, provided by tubes 46 and 48, will be a square pulse of a predetermined length and negative in polarity. The signal thus developed in the plate of tube 48 is applied to a differentiating circuit which includes condenser 51 and resistor 52 to generate successive negative and positive pulses at the grid of tube 54. In the present arrangement tube 54 is designed to respond only to positive pulses and this tube together with tube 56 provides another flip-flop circuit that controls the length of dead-time. In this latter flip-flop circuit condenser 57, together with resistors 58 and 60, may be varied in value to provide control of the actual length of the dead-time.

In operation of the present circuit, another negative square pulse is generated at the plate of tube 54 and is applied to the grid of output tube 62 which acts as an output cathode follower stage. In this circuit resistor 64, likewise connected to the plate of tube 54, provides a bias potential supply that is lower than the B+ for the grid of tube 62. At the same time the negative ends of cathode resistors 66 for tubes 54 and 56 and resistor 67 for tube 62 are held at a negative potential so that the plates of these tubes are made negative, that is, below ground potential, during the period of time referred to herein as the dead-time. In this way the output pulse from tube 62 permits reduction in the plate potential of tube 41 so that succeeding pulses arriving at the grid of tube 41, although above the prescribed minimum amplitude, will not be passed either to the pulse stretcher or to the dead-time circuit.

By the foregoing circuit there is provided an arrangement for utilizing the incoming pulse to effectively render the incoming line inoperative not only during the time the selected pulse is being stretched, but for a time of predeterminable length after termination of the stretching operation.

Figure 3:
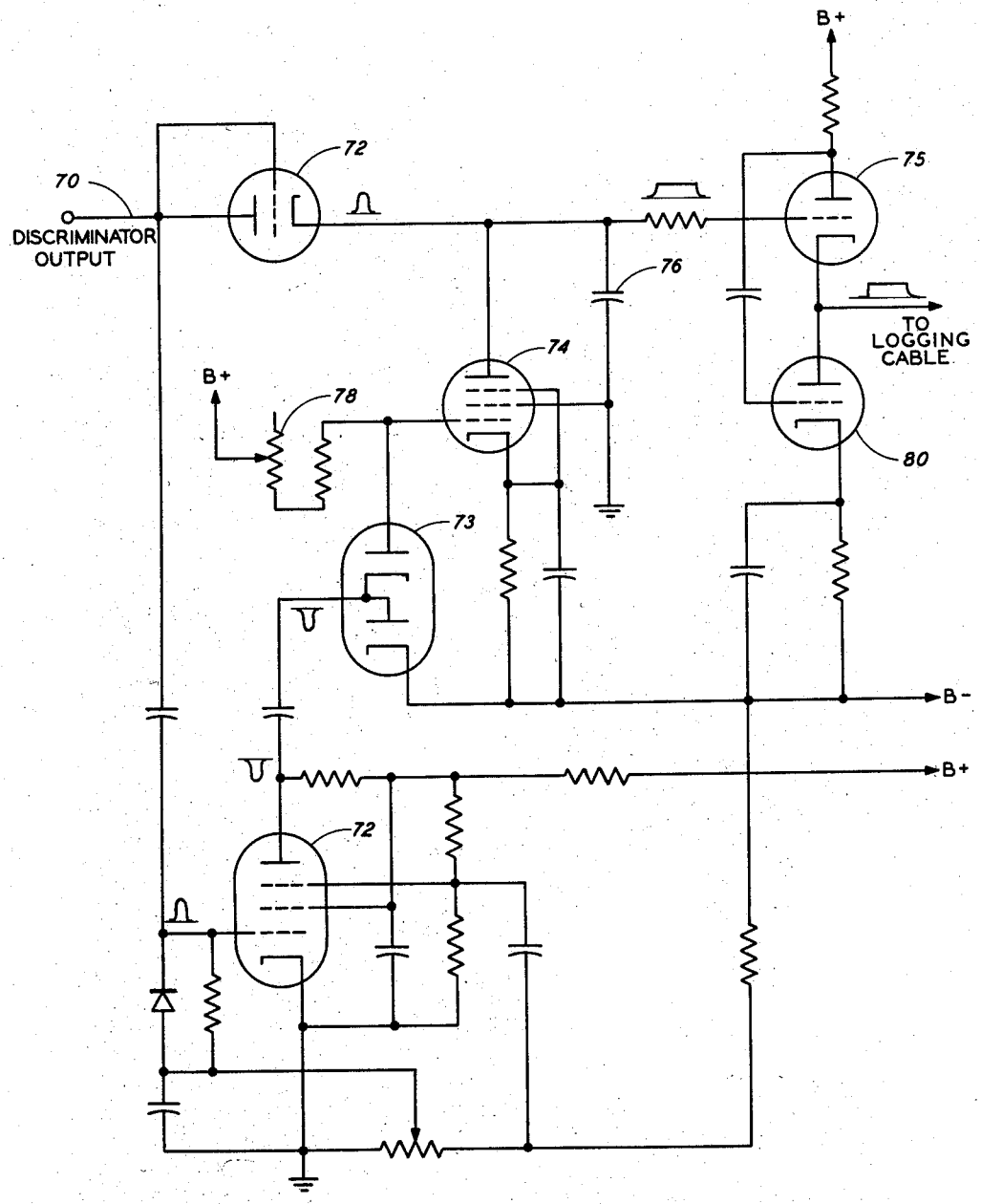
Fig. 3 is a schematic wiring diagram illustrating a preferred form of pulse stretcher for the system of Fig. 1.

As indicated in Fig. 2, the selected pulse that is to be passed to the stretcher is connected to the output of cathode follower stage 41 by line 70. Referring now to Fig. 3, there is illustrated a circuit diagram of the pulse stretcher, identified in Fig. 1 as 24. As seen in Fig. 3, the input from discriminator 21 travels over line 70 through a decoupling tube 72 to the grid of tube 75 and condenser 76. The incoming pulse charges condenser 76 to a potential $V_1$ wherein $V_1$ is substantially equal to the amplitude of the incoming pulse. At the same time, the input pulse on line 70 is applied to the control grid of tube 72 which is normally biased to cut off. The output of 72, a negative pulse, since the incoming pulse is positive, is then applied through diode 73 to the control grid of tube 74. At this time the pulse is made to have a sufficiently negative amplitude to cut off tube 74 until the incoming pulse leaves its grid. Thus condenser 76, connected in the circuit with the plate of tube 74, cannot discharge until tube 74 is permitted to conduct. Tube 74 is held cut-off for a time longer than the duration of the incoming pulse because its grid cannot discharge its negative charge through diode 73 and therefore must discharge through the high resistance of resistor 78.

After discharge of the grid of tube 74 through resistance 78 to an extent sufficient to permit tube 74 to again conduct, condenser 76 may discharge, thus terminating the pulse on that condenser and on the grid of tube 75. The duration of this pulse is equal to the length of time tube 74 is cut off and this in turn depends on the time required for the grid of 74 to discharge through resistor 78. This time is a function of the capacitance of the grid of tube 74 and the remaining electrodes, as well as the value of resistance 78. As indicated, resistance 78 is variable so that the duration of the output pulse from the pulse stretcher can be controlled by varying the value of resistor 78.

It is of course desirable that all output pulses from pulse stretcher 24 be of the same duration. To accomplish this, tube 74 must be cut off for the same period of time regardless of the amplitude of the incoming pulse. For this purpose tube 72 is chosen to operate so that the amplitude of its output pulse is independent of the amplitude of the input pulses supplied to the grid thereof.

The pulse output from pulse stretcher 24 has a duration determined in the manner discussed above. As further shown in Fig. 3, tubes 75 and 80 form the output stage of pulse stretcher 24 in a manner such that tube 75 operates as a cathode follower while tube 80 acts as the cathode resistor of tube 75. Thus, the amplitude of the output pulse is a linear function of, and substantially equal to, the amplitude of the input pulse.

Without the foregoing circuit, it has been necessary to maintain the counting rate at the detector sufficiently low so that the pulses in the cable could be spaced in time over intervals many times the duration of the pulses themselves. Where said pulses occur at random times such a low counting rate must be maintained to prevent overlapping of said pulse. With use of the circuit of the present invention, it is possible to increase the counting rate at the gamma ray detector because the pulses are spaced in time over the cable at intervals comparable to their own pulse duration; hence, the pulse transmission rate and logging speed can be increased by an order of magnitude. In the present arrangement, advantage is taken of the high counting rate to assure the arrival of another pulse as quickly as possible after the end of the predetermined time after the selected pulse has been transmitted. Furthermore, whereas without use of the present circuit the duration of the pulses in the cable must be maintained as short as possible, use of the present circuit permits further lengthening or stretching of the pulses, thus facilitating their transmission over very long cables, or over cables of inferior frequency transmission characteristics. Hence, it is economical to use very long cables with lengths of approximately 20,000 feet; whereas, without the circuit it is not economical to use such cables. Furthermore, because of the reduction in the requirements on frequency transmission characteristics, it is possible to maintain a logging cable in service over a longer period of time than without use of such circuit.

An additional feature of this invention is the use of circuitry to reject all high-frequency pulses from the radiation detector having amplitudes less than that corresponding to a particular energy of the nuclear radiation which energy is generally selected to be comparatively low on the energy spectrum scale. This feature is of considerable value because it is a characteristic of neutron capture gamma radiation from a formation, for example, that a large fraction of the total gamma radiation detected in the bore hole has been Compton scattered either in the formation or in the detector, and consequently cannot have its energy identified directly with that of a gamma ray of a particular energy known to be emitted by a particular isotope upon neutron capture. This Compton-scattered gamma radiation is mainly of low energy and the rejection of pulses from such useless radiation, as specified above, reduced considerably the total number of pulses to be transmitted. Hence, the number of useful pulses transmitted can be increased proportionately with attendant increase in logging speed; or the lengths of the pulses actually transmitted may be increased, at a given counting rate of useful pulses, so as to attain transmission over cables of greater length.

Various modifications and changes in the method of the present invention will be apparent to those skilled in the art from the foregoing description. Among such changes is the use of a circuit that rejects any two pulses occurring within a predetermined time interval of one another in place of the "dead-time" circuit described above. However, all such modifications and changes which fall within the scope of the appended claims are intended to be included therein.

We claim:

1. The method of transmitting individual electrical pulses corresponding to portions of a gamma ray energy spectrum to the earth's surface over a well logging cable of limited power and frequency characteristics, which comprises the steps of generating a train of individual electrical pulses, each corresponding in amplitude to the energy dissipated by interaction of individual gamma rays with a radiation detector and arising from an earth formation traversed by a well bore, each of said pulses occurring randomly in time and having an initial duration corresponding to the time of response of the detector to the interaction, selecting at random one of such electrical pulses having at least a predeterminable minimum amplitude, elongating said selected pulse for a predeterminable period of time at least several times the initial length of the pulse, passing said elongated pulse to said well logging cable for transmission to the earth's surface, and deriving a signal from at least a portion of said selected pulse to prevent selection of a second randomly generated pulse during said predeterminable time interval for elongation of said first pulse, and delaying the selection of another pulse from said train of electrical pulses for a second predeterminable time interval after transmission of said first pulse to said well logging cable to prevent pile-up of said pulses during transmission to the earth's surface.

2. Apparatus for transmitting individual electrical pulses corresponding to portions of a nuclear radiation spectrum arising from an earth formation traversed by a well bore to the earth's surface over a cable of limited power and frequency characteristics comprising a detector for generating a train of electrical pulses, each proportional in amplitude to the energy dissipated by a nuclear event interacting with the detector and random in time of origin as a result of nuclear radiation originating in said earth formation, means for eliminating pulses of less than a predetermined amplitude, pulse elongating means for converting one of said random pulses from said detector to a pulse of known duration while maintaining the amplitude proportional to the energy of the nuclear event originating the pulse, means responsive to the initiation of said one random pulse for disconnecting said detector from said pulse elongating means, said pulse responsive means including means for maintaining said disconnection operative for a predeterminable time interval after conversion of said one random pulse, and means for supplying in predeterminable time sequence said elongated random pulses to said cable of limited power and frequency characteristics whereby said pulses may be recorded at the earth's surface to develop said nuclear radiation spectrum.

3. Apparatus for transmitting individual electrical pulses corresponding to portions of a nuclear radiation spectrum arising from an earth formation traversed by a well bore to the earth's surface over a cable of limited power and frequency characteristics comprising a detector for generating a train of electrical pulses, each proportional in amplitude to the energy dissipated by a nuclear event interacting with the detector and random in time of origin as a result of nuclear radiation originating in said earth formation, discriminator means for passing pulses of greater than a predetermined amplitude, pulse elongating means for converting one of said random pulses from said discriminator means to a pulse of known duration while maintaining the amplitude in substantially linear relation to the energy of the nuclear event originating the pulse, means responsive to the initiation of said one random pulse for disconnecting said detector from said pulse elongating means, said pulse responsive means including means for maintaining said disconnection operative for a predeterminable time interval after conversion of said one random pulse, means for supplying in predeterminable time sequence said elongated random pulses to said cable of limited power and frequency characteristics, means for measuring at least the maximum amplitude of each of said elongated pulses at the end of said cable and means for recording a plurality of said measured pulses as a nuclear radiation spectrum representative of said formation, said recording being in accordance with the depth of said detector in the well bore.

4. Well logging apparatus for recording at the earth's surface a gamma ray spectrum of an earth formation traversed by a well bore which comprises a gamma ray energy detector adapted to be suspended in a well bore on an electrical cable having limited power and frequency characteristics, amplifier means for converting each randomly occurring gamma ray interaction with said detector to an electrical pulse having an amplitude corresponding to the energy dissipated in said interaction, means for selecting one of the correspondingly random electrical pulses having at least a predeterminable minimum value, means for elongating the one random pulse for a predeterminable time substantially without loss of the linear relation between pulse amplitude and interaction energy, means responsive to said pulse selecting means for disabling said pulse selecting means for a period of time substantially longer than said predeterminable time, means for supplying said elongated random pulse to said electrical cable, means for recording the amplitude of said random pulse at the earth's surface, and means for connecting said pulse selecting means to said amplifier means after the end of said longer time period to permit a succeeding random pulse to be elongated for transmission over said cable for recording at the earth's surface.

5. A method of transmitting pulses over a cable of limited frequency and power characteristics comprising the steps of generating a plurality of electrical pulses of random magnitudes and frequency of occurrence, each of said pulses being characteristic of one of a plurality of statistical quantities to be recorded at the end of said cable remote from the generation of said pulses, shaping each electrical pulse to a predeterminable wave form, selecting at random one of said plurality of pulses, lengthening said selected pulse while preserving its proportionality in amplitude to the original pulse so that its length is at least several times the original length of said selected pulse, blocking the selection of any of the remainder of said plurality of pulses while said selected pulse is being lengthened, feeding said lengthened pulse to said cable for transmission thereover, and then allowing the selection of another of said random pulses a predeterminable time after said other pulse lengthening is completed, said time being not greater than the period of time for lengthening said other pulse to permit recording of each of said lengthened pulses as a statistical measure of the frequency of occurrence and random magnitudes of the original pulses.

6. A method of transmitting pulses over a well logging cable of limited frequency and power characteristics for recording of a gamma ray energy spectrum at the earth's surface comprising the steps of generating a plurality of electrical pulses, said pulses being random both in magnitude and frequency of occurrence, each of said pulses being characteristic of one quantum in a gamma ray energy spectrum being generated in a well bore at the lower end of said logging cable, shaping each electrical pulse to a predeterminable wave form, selecting a first one of said plurality of pulses having at least a minimum magnitude, lengthening said first pulse so that its length is at least several times the original length of said selected pulse, preserving its proportionality in magnitude to said original pulse, preventing the acceptance of any of said following random pulses of said plurality while said first pulse is being lengthened, transmitting said lengthened pulse to said cable, then accepting another of said pulses a predeterminable time after said first pulse lengthening is completed, said time being not greater than the period of time for the lengthening of said first pulse, and recording a plurality of said lengthened pulses at the earth's surface to form a statistical sample of a gamma ray energy spectrum of an earth formation along the well bore in which said logging cable is disposed.

References Cited in the file of this patent

UNITED STATES PATENTS

| | | |
|---|---|---|
| 2,548,449 | Staub | Apr. 10, 1951 |
| 2,686,268 | Martin et al. | Aug. 10, 1954 |